Feb. 28, 1939.  W. D. HAIGH  2,148,551
PORTABLE STOCK HOLDER
Filed Sept. 20, 1937  2 Sheets-Sheet 1

INVENTOR
Wm. D. Haigh
BY
ATTORNEY

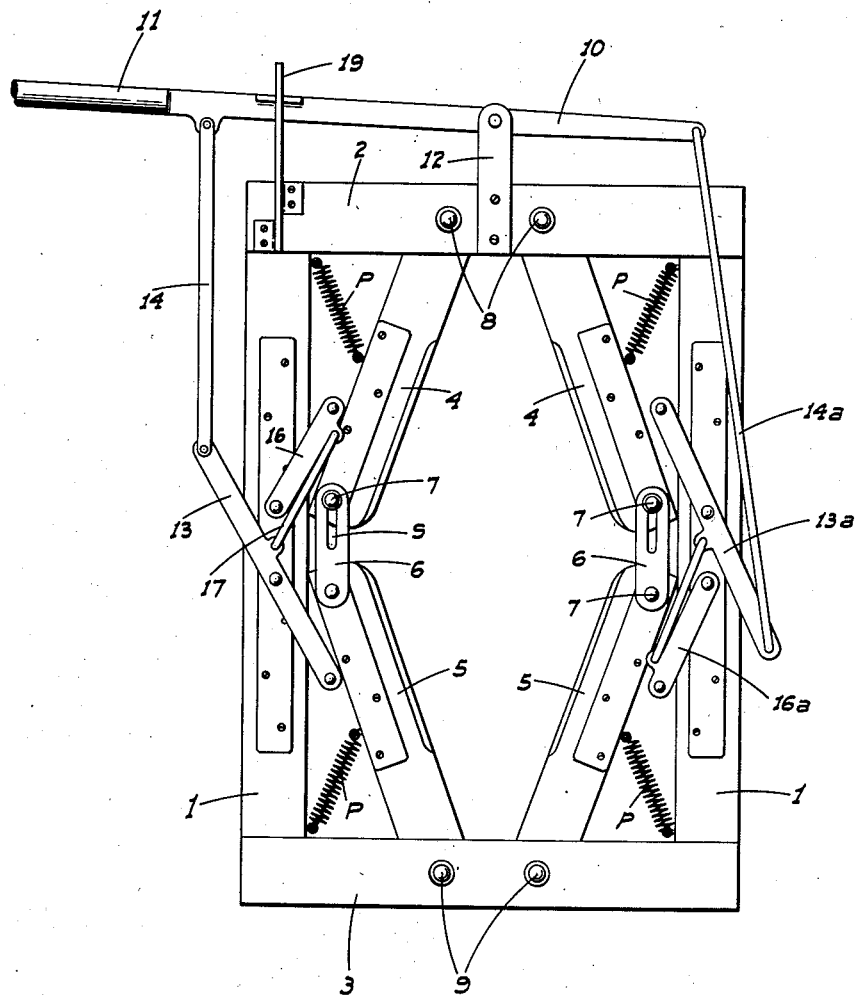

Patented Feb. 28, 1939

2,148,551

UNITED STATES PATENT OFFICE 2,148,551

PORTABLE STOCK HOLDER

William D. Haigh, Coulterville, Calif.

Application September 20, 1937, Serial No. 164,646

5 Claims. (Cl. 119—98)

This invention relates generally to a device for temporarily but securely holding stock, such as calves, in order that the stock may be branded, dehorned, castrated and the like; the invention being directed in particular to that type of device known to the trade as a stanchion or "stock necker."

Heretofore the stock holders have been so constructed that upon separation of the stock holding bars and release of the animal therefrom, there was not sufficient space between the holding bars for the animal to pass therebetween. This required that the entire device be mounted for swinging movement to permit escape of the animal from the stock chute in the outer end of which the device was disposed for use. Furthermore, such devices were permanently installed in stock chutes and could not be transported from place to place.

It is therefore the principal object of my invention to provide a stock holder which, when disposed in a stock chute for use, will effectively engage an animal's neck between the holding bars when in closed position and yet will have sufficient space between the holding bars when in open position for an animal to pass between. With my device, it is not necessary that the entire device be moved before the animal can leave the chute.

It is also my object to provide a device of the character described which is readily portable and can be carried from place to place for use in stock chutes not now provided with stock holding apparatus.

A further object of the invention is to produce a simple and inexpensive device and yet one which will be exceedingly effective for the purpose for which it is designed.

These objects I accomplish by means of such structure and relative arrangement of parts as will fully appear by a perusal of the following specification and claims.

In the drawings similar characters of reference indicate corresponding parts in the several views:

Figure 2 is a front elevation of the device in open position.

Figure 1:
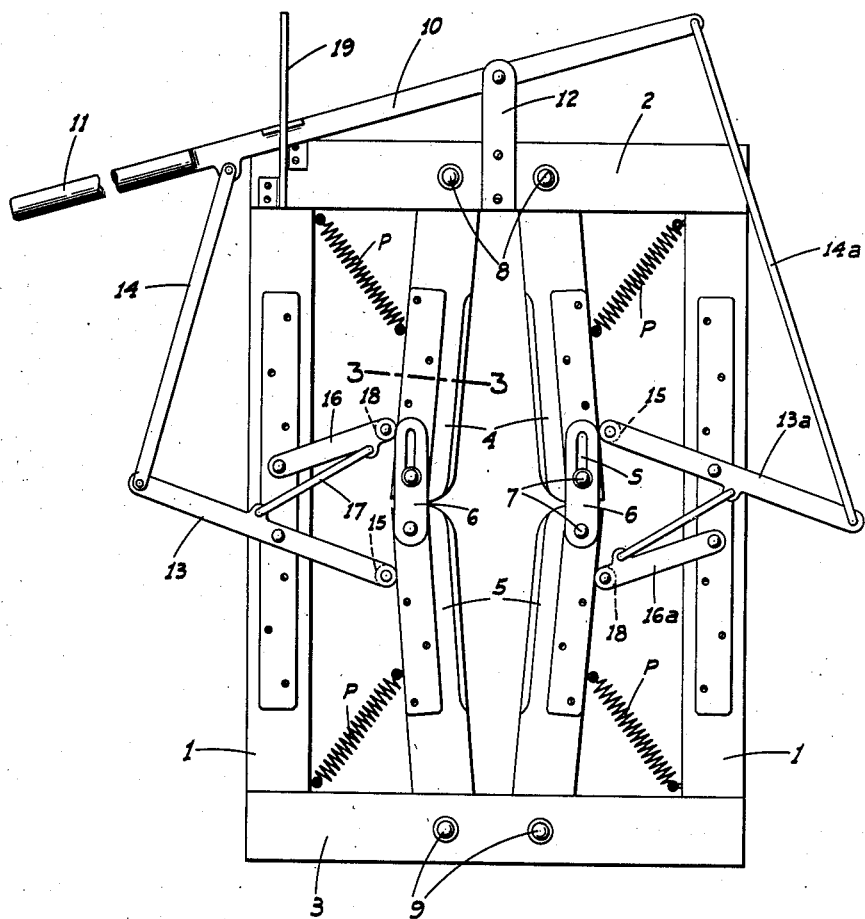
Figure 1 is a front elevation of the device in closed position.
Figure 3:
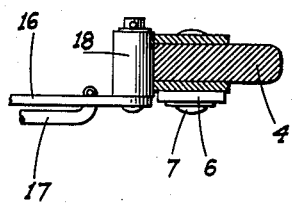
Figure 3 is a cross section taken on line 3—3 of Fig. 1.

Referring now more particularly to the characters of reference on the drawings, the device comprises a relatively large, rectangular supporting frame including spaced vertical side members 1, a top cross member 2 and a bottom cross member 3.

A pair of spaced, articulated holding or neck engaging bar units are mounted vertically on the supporting frame; each holding bar unit including an upper bar section 4, an alined lower bar section 5 of substantial equal length, and a connecting link 6 pivoted by headed pins 7 on the adjacent ends of said sections 4 and 5, and having a longitudinal slot S through which one pin rides. The bar sections 4 are pivoted at their upper ends as at 8 to the top cross member 2 while the bar sections 5 are pivoted at their lower ends as at 9 to the bottom cross member 3. The pivots 8—8 and 9—9 are disposed relatively close together as shown. The inner or animal engaging edges of the bar sections are rounded to prevent injury to the animals held in the device. Pull springs P connected between each bar section intermediate its ends and the adjacent corner of the supporting frame, urge the sections to swing outward about their pivots.

A transversely extending lever 10, having a handle 11 on one end, is disposed above top cross member 2 and is pivoted intermediate its ends on an upstanding bracket 12. Another lever 13 is pivoted intermediate its ends to one side member 1 of the supporting frame, and is disposed at an upward slope from its inner end, the outer end of the lever 13 being connected by a pivotally mounted rod 14 with the corresponding end of the lever 10. The inner end of lever 13 is provided with a roller 15 which rides against the edge of the adjacent lower bar section 5.

A link 16 is pivoted to said one side member 1 above lever 13 and is held in an upwardly sloping position by a pivoted tie rod 17 which extends from lever 13 adjacent its pivot to the link 16 adjacent the inner end thereof. The inner end of link 16 is provided with a roller 18 which rides the side of the adjacent upper bar section 4. A notched latch guide 19 of conventional form cooperates with lever 10 to hold the same in any selected position. A like lever, link and rod assembly as above described, is mounted in connection with the other articulated holding bar unit, the lever 13a and link 16a being reversed in position and rod 14a being connected to the other end of lever 10 from rod 14. The purpose of such reversal is of course to provide the same movement of lever 13a and link 16a as lever 13 and link 16 with movement of pivoted lever 10. The lever 10 moves in the same plane as levers 13 and 13a.

In use, the above described device is disposed vertically in the outer end of a stock chute and removably secured in place by suitable means. With upward movement of handle 11, the inner ends of corresponding levers 13 and 13a and links 16 and 16a separate, the springs S breaking the articulated bar units outward as shown in Fig. 2. As an animal passes down the chute and its head passes between the bar units, the handle 11 is lowered causing the lever and link assembly to swing the bar sections inwardly toward a vertical parallel position, and engage the animal's neck in holding relation. The dehorning, branding, etc., can then be done as the animal cannot escape. When such operations are complete, the articulated bar sections are again broken outward and the animal can escape therebetween and from the chute. When the bar sections are broken outward, there is ample clearance therebetween and particularly between the central portions of the units for the passage of an animal; such central clearance being provided by reason of the fact that bar sections 4 and 5 are of substantially equal length. It is desirable that the greatest clearance be centrally of the ends of the articulated bar units when broken outward so that the body of an animal can pass therebetween without interference.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention, what I claim as new and useful and desire to secure by Letters Patent is:

1. A stock holder comprising an open frame adapted to be disposed in a stock chute in substantially vertical position, a pair of articulated holding bar units extending between opposite members of the frame in spaced relation, each unit including a pair of holding bar sections disposed in end to end relation and means freely pivoting said sections together at adjacent ends, the outer end portion of each bar section being pivoted to the adjacent member of the frame, means urging the units in an outwardly breaking direction, a lever pivoted intermediate its ends on each of other opposite members, the inner end of each lever cooperatively engaging one of the bar sections of the adjacent unit, a link pivoted on each of said other members and cooperatively engaging the other section of the adjacent unit, the corresponding levers and links diverging toward the adjacent unit, a pivoted tie rod extending between each lever outwardly of its pivot and the corresponding link inwardly of its pivot, and means to swing the levers about their pivots.

2. A device as in claim 1 in which the links and levers are reversed in position relative to the sections; the device including a control lever pivoted intermediate its ends on the frame for movement in the same plane as the first named levers, and a pivoted connecting rod extending between each end of said control lever and the outer end of each of said first named levers whereby with movement of the control lever in one direction, the inner ends of the first named levers and links will swing in a separating direction.

3. A stock holder comprising an open frame adapted to be disposed in a stock chute in substantially vertical position, a pair of articulated holding bar units extending between opposite members of the frame in spaced relation, each unit including a pair of holding bar sections disposed in end to end relation and means freely pivoting said sections together at adjacent ends, the outer end portion of each bar section being pivoted to the adjacent member of the frame, spring means for breaking the articulated units away from each other, and means for controlling said breaking movement; said last named means including a lever and link assembly mounted on the supporting frame and cooperatively engaging the units to move the same in opposition to said spring means.

4. A stock holder comprising an open frame adapted to be disposed in a stock chute and including side members and top and bottom members, neck engaging means comprising a pair of laterally spaced articulated bar units extending between the top and bottom members of the frame and pivoted thereon, means acting on the units to break the same away from each other to release the neck of an animal and allow the same to move from between the units, and manually actuated means to move the units to a substantially alined and neck engaging position in opposition to the unit breaking means; said manually actuating means comprising a pair of levers pivoted on each of the adjacent side members of the frame, the levers of each pair extending thence inwardly of the frame and toward the adjacent bar unit in diverging relation to each other and to a horizontal plane, elements on the inner ends of the levers of each pair, said elements riding on the adjacent edges of the adjacent bar unit beyond its point of breaking, a manually actuated element applied to one lever of each pair to swing said lever toward a horizontal position, and connecting means between the levers of each pair to cause the other lever to be simultaneously moved toward a horizontal position.

5. A stock holder comprising an open frame adapted to be disposed in a stock chute in substantially vertical position, a pair of articulated holding bar units extending between opposite members of the frame in spaced relation, each unit including a pair of holding bar sections disposed in end to end relation and means freely pivoting said sections together at adjacent ends, the outer end portion of each bar section being pivoted to the adjacent member of the frame, instrumentalities for actuating the articulated holding bar units to and from a broken position, the holding bar sections of each unit being of substantially equal length whereby when the units are broken outward the greatest clearance therebetween is in a plane centrally of the ends of said units whereby the body of an animal can pass between said outwardly broken units without interference.

WILLIAM D. HAIGH.